UNITED STATES PATENT OFFICE.

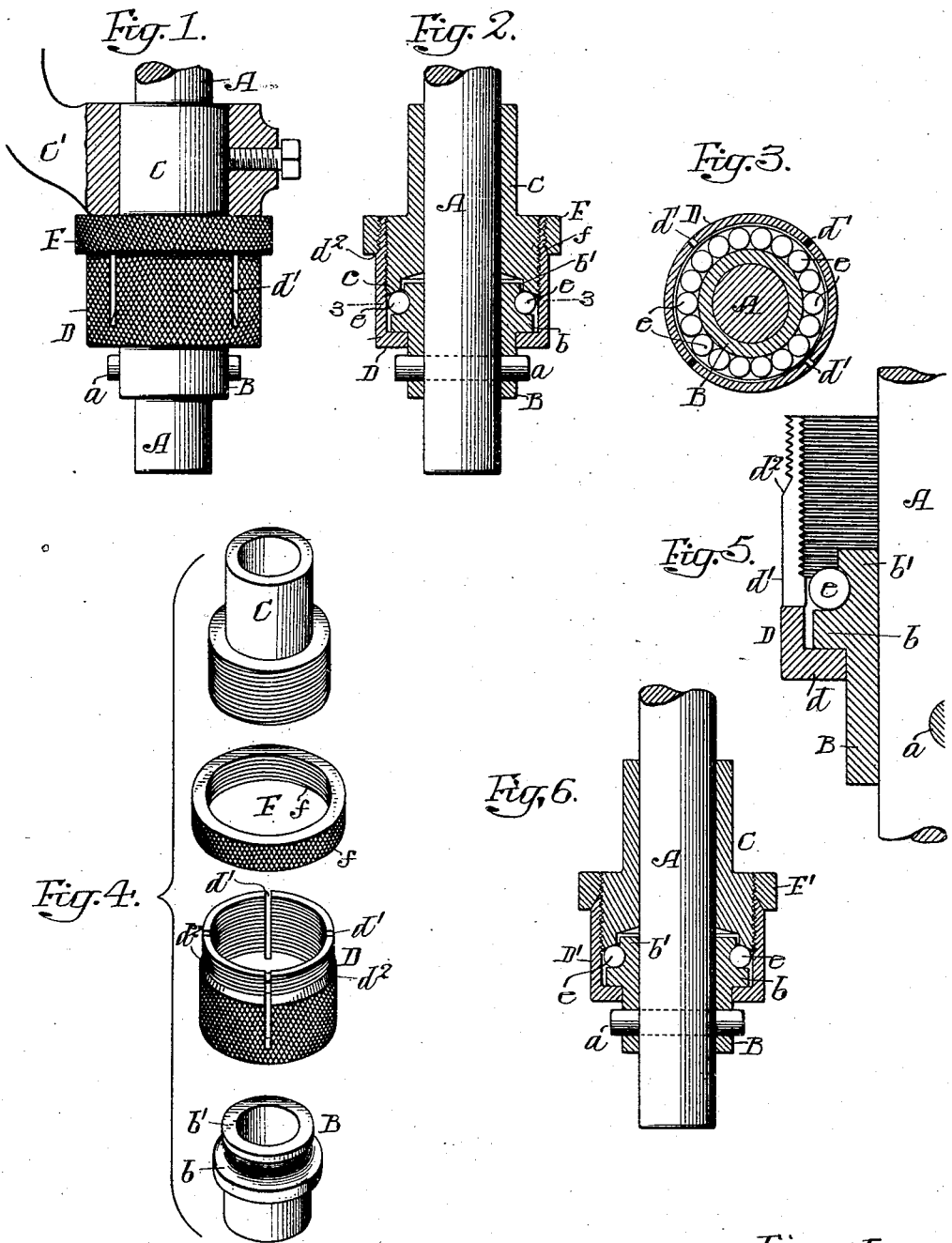

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

BALL-BEARING.

968,372. Specification of Letters Patent. Patented Aug. 23, 1910.

Application filed August 27, 1909. Serial No. 514,877.

*To all whom it may concern:*

Be it known that I, GEORGE O. LEOPOLD, a citizen of the United States, residing in Philadelphia, Pennsylvania, have invented certain Improvements in Ball-Bearings, of which the following is a specification.

The object of my invention is to construct a ball bearing which can be cheaply manufactured and which can be partly detached without freeing the balls.

My invention is particularly adapted for use in small work such as drills and other hand tools, but it will be understood that it can be used for other purposes without departing from the essential features of the invention.

In the accompanying drawings:—Figure 1, is a side view of my improved ball bearing; Fig. 2, is a vertical sectional view; Fig. 3, is a transverse sectional view on the line 3—3, Fig. 2; Fig. 4, is a perspective view of the parts detached; Fig. 5, is an enlarged view of a part of Fig. 2; and Fig. 6, is a view of a modification of my invention.

A is the spindle to which is attached, in the present instance, the ball carrying member B of the ball bearing; the spindle being secured to the carrying member by a transverse pin $a$, in the present instance.

C is the bearing member which is secured to a frame C' forming part of the support of the tool to which my improved bearing is applied. The spindle A extends through the bearing member C and fits snugly therein; the bearing member acting as a lateral support for the spindle.

D is a casing having an internal flange $d$ which extends under the shoulder $b$ of the ball carrying member B, and this casing has an internal screw thread and an external screw thread. The bearing member C has an external screw thread adapted to the internal screw thread of the casing D and when it is screwed into position the two members B and C are drawn together so that the balls $e$ rest between the pocket in the member B and the beveled edge $c$ of the member C and clear of the casing, as shown in Fig. 2. The space between the portion $b'$ of the member B and the casing is less than the diameter of the balls $e$, so that when the bearing member C is removed the balls cannot fall out if the bearing is inverted, as the pin $a$ holds the casing in position. When it is wished to remove the balls, however, all that is necessary is to remove the pin and withdraw the casing, then the balls are free to be removed. In order to secure the casing rigidly to the bearing member C, I slot the casing at two or more points $d'$ and thread the casing at one end, applying a nut F to the threaded portion of the casing. The lower portion of this nut is beveled as at $f$ to bear against the beveled portion $c^2$ of the casing, so that when the nut is screwed down firm it has a tendency to draw the casing tightly onto the bearing member, preventing the movement of one part in respect to the other after adjustment. By this construction the balls can travel free without binding. When it is desired to remove the parts, all that is necessary is to back off the nut F and then turn the casing on the bearing member and the two parts can be readily detached.

It will be noticed that the ball carrying member is greater in diameter on one side of the groove than on the other. By this construction a bearing for the ball is provided on the portion of greater diameter and the extension of the bearing member rests directly on the balls; the end of the bearing member being grooved to receive the reduced portion of the carrying member, but the space between this reduced portion and the casing is not sufficient to allow the balls to escape when the bearing member is removed, so that the balls can not become detached until the casing is removed.

In Fig. 6, I have shown a modification in which the end of the casing D' is beveled and the nut F' is adapted to the threads of the bearing portion C, the bevel of the nut bearing directly upon the beveled end of the casing D'.

I claim:—

1. The combination of a ball carrying and a ball bearing member; a casing extending around said members; a series of balls between the members, the width of the space between the casing and one of the members being insufficient to permit of the passage of the balls in the absence of the other member; with means for normally preventing the removal of the casing from the ball carrying member.

2. The combination in a ball bearing of a spindle, a ball carrying member secured to the spindle; a series of balls co-acting with said member; a casing having an internal thread at one end and an internal flange at the other end extending under the ball carrying member; with a bearing member having a screw threaded periphery engaging the thread of the casing; and having an end engaging the balls; the space between the ball carrying member and the casing being insufficient to permit the removal of the balls in the absence of the bearing member.

3. The combination in a ball bearing, of a spindle, a grooved ball carrying member secured to the spindle, a series of balls in the groove thereof, a flanged casing having an internal screw thread, the carrying member and the casing being so proportioned that the balls will be retained in their groove by the casing, a bearing member having a threaded periphery adapted to the threads of the casing, said casing being slotted and beveled at the end opposite its flange, with a beveled nut adapted to draw the end of the casing onto the threaded portion of the bearing member.

4. The combination in a ball bearing, of a spindle, a grooved carrying member, a series of balls mounted in the groove thereof, a casing arranged to retain the balls in the groove, said casing having an internal screw thread, a bearing member having an external screw thread adapted to the threads of the casing and having a beveled end resting against the balls, the end of the bearing member being recessed to receive an extension of the ball carrying member.

5. The combination in a ball bearing, of a spindle, a carrying member secured thereto and having a groove in its periphery, the said carrying member being greater in diameter on one side of the groove than on the other, a series of balls mounted in the groove, a casing having an internal flange adapted to extend under the carrying member and having an internal thread at its opposite end and an external thread also at its opposite end, said casing having a series of longitudinal slots, a bearing member loosely mounted on the spindle and having a thread on its periphery adapted to the internal threads of the casing and having a recess at one end to receive the end of the carrying section, the portion between the recess and the periphery being beveled to bear against the walls, with a nut adapted to the external thread of the casing so that when the nut is applied it will draw the casing tightly onto the bearing member.

6. The combination in a ball bearing, of a spindle, a grooved ball carrying member, a transverse pin holding the said member on the spindle, a flanged casing held from removal from the ball carrying member by the said pin and spaced away from said ball carrying member a distance insufficient to permit of the passage of the balls, balls mounted in the groove, and a bearing member loosely mounted on the spindle and bearing against the balls.

7. The combination in a ball carrying and a ball bearing member; a casing extending around said members; and a series of balls; the width of the space between said casing and one of said members being insufficient to permit of the passage of the balls in the absence of the other member.

8. The combination of a ball carrying and a bearing member; a casing extending around said members; and a series of balls; one of said members being spaced away from the casing at a distance less than the diameters of the balls, and the other member having a portion extending through the space between the casing and the other member into engagement with said balls.

In testimony whereof, I have signed my name to this specification, in the presence of two subscribing witnesses.

GEORGE O. LEOPOLD.

Witnesses:
WM. A. BARR,
HENRY HOWSON.